United States Patent [19]
Clark

[11] 3,895,263
[45] July 15, 1975

[54] GROUNDED NEUTRAL DETECTOR DRIVE CIRCUIT FOR TWO POLE GROUND FAULT INTERRUPTER

[75] Inventor: William R. Clark, Bedford, Mass.

[73] Assignee: I-T-E Imperial Corporation, Spring House, Pa.

[22] Filed: Aug. 27, 1974

[21] Appl. No.: 501,192

[52] U.S. Cl............ 317/18 D; 317/27 R; 317/33 SC
[51] Int. Cl.............................................. H02h 3/28
[58] Field of Search............ 317/18 D, 27 R, 33 SC

[56] References Cited
UNITED STATES PATENTS

| | | | |
|---|---|---|---|
| 3,473,091 | 10/1969 | Morris et al. | 317/18 D |
| 3,506,906 | 4/1970 | Nestor | 317/18 D |
| 3,611,035 | 10/1971 | Douglas | 317/18 D |

Primary Examiner—James D. Trammell
Attorney, Agent, or Firm—Ostrolenk, Faber, Gerb & Soffen

[57] ABSTRACT

A ground fault detector for a three-wire single phase A.C. system including protector means to maintain level of performance in the event the neutral is grounded on the load side of the detector is provided with solid state switching means which maintains the protector means energized so long as at least one hot wire of the A.C. system is energized.

4 Claims, 1 Drawing Figure

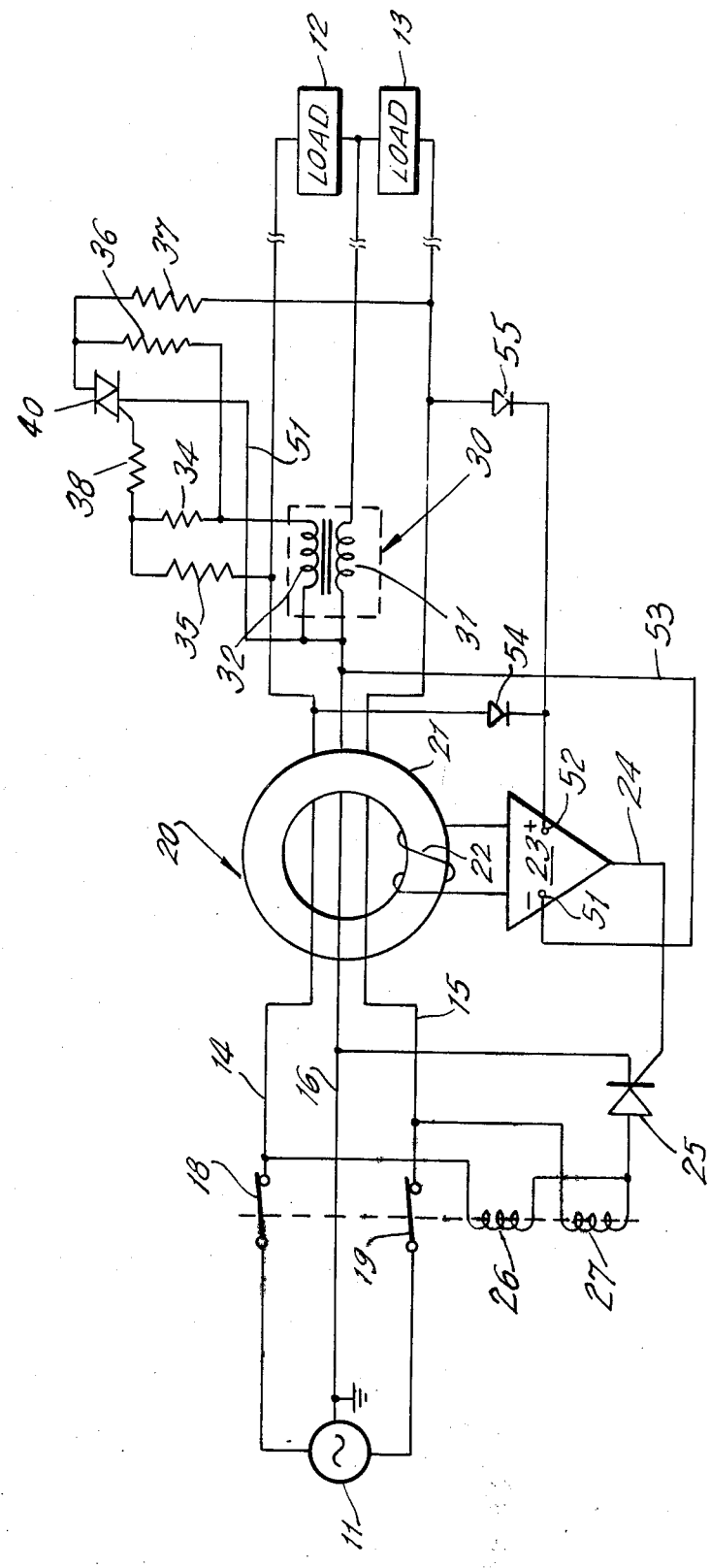

GROUNDED NEUTRAL DETECTOR DRIVE CIRCUIT FOR TWO POLE GROUND FAULT INTERRUPTER

A common method for protecting against high impedance ground faults is to detect the net value of current flowing in the main conductor by utilizing a differential transformer. It has been found that this type of detector will, at the worst, cease to function or, at best, will function with performance considerably downgraded in the event the neutral conductor becomes grounded on the load side of the transformer, since under these conditions the neutral primary winding of the transformer is essentially shorted.

In order to maintain performance of the detector when the load neutral is grounded, the prior art, as exemplified by U.S. Pat. No. 3,473,091 to A. R. Morris et al. for a Ground Leakage Differential Protective Apparatus and U.S. Pat. No. 3,506,906 to D. W. Nestor for a Ground Fault Circuit Interrupter With Inadvertent Ground Sensor, provides means for producing a potential in series with the neutral primary winding of the differential transformer. One such means consists of an auxiliary transformer whose primary is energized from the power line being protected and whose secondary is in series with the neutral primary winding of the differential transformer. In a single phase grounded neutral three-wire system, in the event one of the hot conductors is deenergized, it is desirable that loads connected to the other hot conductor continue to be energized and at the same time the ground fault detector must be protected against malfunctioning in the event the neutral becomes grounded on the load side of the detector.

In order to accomplish this purpose, the instant invention utilizes an auxiliary transformer whose secondary is connected in series with the neutral power conductor and whose primary winding remains energized so long as at least one of the hot conductors is energized. More particularly, circuitry is provided to normally connect the primary winding of the auxiliary transformer for energization by one of the hot conductors and in the event this hot conductor becomes deenergized, a switching device is operated to energize the auxiliary transformer primary from the other hot conductor.

Accordingly, a primary object of the instant invention is to provide means for maintaining energization of a protector means that prevents downgrading of ground fault detector circuitry in the event the neutral conductor of a single phase three-wire system becomes grounded on the load side of the detector.

Another object is to provide means of this type which is normally energized from one of the hot conductors in a single phase three wire system, and in the event this conductor becomes deenergized a solid-state switching means is operated to energize the detector means from the other hot conductor of the three-wire system.

These objects as well as other objects of this invention will become readily apparent after reading the following description of the accompanying drawing in which the single FIGURE is a schematic showing a ground fault detector-interrupter for a single-phase three-wire system, and including means constructed in accordance with the instant invention for maintaining the neutral detecting protector means for the differential transformer detector energized so long as at least one of the hot conductors in the system is energized.

Now referring to the Figures. Single phase three-wire A.C. source 11 is connected to loads 12, 13 by energizing conductors 14, 15, and 16. Conductors 14 and 15 are designated the hot conductors, and conductor 16, at a potential intermediate the potentials of conductors 14 and 15, is designated the neutral conductor. The latter is grounded at source 11. Ganged interrupter switches 18, 19 are connected in series with hot conductors 14, 15, respectively.

All three conductors 14–16 extend through torroidal magnetic core 21 of differential transformer 20 to constitute single turn primary windings thereof. Transformer 20 is also provided with multi-turn secondary winding 22 connected to the input of amplifier 23 whose output 24 is connected to the control electrode of solid state switch 25. The power circuit of switch 25 is connected from neutral conductor 16 through switch operating coils 26, 27 to hot conductors 14, 15, respectively. Operating coils 26, 27 are so arranged that upon energization of either or both of them, both switches 18 and 19 will open. In a manner well known to the art, when a predetermined unbalanced current condition in conductors 14–16 is detected by differential transformer 20, an output signal is induced in secondary 22 to produce a signal at amplifier output 24 which drives switch 25 into a conducting state, thereby completing energizing paths for switch operating coils 26, 27.

On the load side of differential transformer 20, neutral conductor 16 is connected through secondary winding 31, of protector means transformer 30, to the junction between loads 12 and 13. Primary winding 32 of transformer 30 is connected at one end thereof to neutral conductor 16 on the line side of secondary 31, and the other end of primary 32 is connected through the series path of resistors 34, 35 to hot conductor 14 and through the series path of resistors 36, 37 to hot conductor 15. The junction between resistors 34, 35 is connected through resistor 38 to the control electrode of solid-state switching device 40, whose power circuit is connected between neutral conductor 16, on the line side of transformer 30, and the junction between resistors 36 and 37.

With both hot conductors 14, 15 energized, protector means transformer 30 is energized from hot conductor 14 in that at this time switch 40 is in a conducting state so that the junction between resistors 36, 37 is essentially at neutral potential so that current through resistor 37 flows through switch 40 and conductor 51 to shunt primary 32. In the event hot conductor 14 becomes deenergized, the potential at the control electrode of switch 40 will drop and switch 40 will become non-conductive. Under these conditions the energizing paths for primary winding 32 extend through resistors 36, 37 to hot conductor 15.

Voltage appears at energizing terminals 51, 52 of amplifier 23 when either or both lines 14, 15 are energized. More particularly, line 53 connects negative energizing terminal 51 directly to neutral 16 on the load side of transformer 20, and positive energizing terminal 52 is connected through diodes 54, 55 to the respective hot conductors 14, 15 on the load side of transformer 20.

Thus, it is seen that the instant invention provides means whereby auxiliary transformer 30, which prevents performance of differential transformer 20 from being downgraded in the event neutral conductor 16 is grounded near loads 12, 13, is normally energized from hot conductor 14, but in the event conductor 14 becomes deenergized, automatic switching means is effective to cause energization of auxiliary transformer 30 from the other hot conductor 15.

Although there have been described preferred embodiments of this novel invention, many variations and modifications will now become apparent to those skilled in the art. Therefore, this invention is to be limited not by the specific disclosure herein but only by the appending claims.

The embodiments of the invention in which an exclusive privilege or property is claimed are defined as follows:

1. Ground fault detector-interrupter means for a single phase three-wire system having first and second hot conductors at opposite potential with respect to a common neutral conductor grounded at the source energizing said system; said detector-interrupter means including a differential transformer having first, second, and third primaries connected in series with the first, second, and said ground conductors, respectively, and a secondary wherein net flux generated by unbalanced currents in said primaries induce a fault signal interrupter means in series with said first and second conductors, amplifier means connected between said secondary and said interrupter means to actuate the latter for opening at least one of said hot conductors when said fault signal is of a predetermined characteristic; protector means to maintain performance of said differential transformer in the event the neutral conductor becomes grounded near a load energized by said system; circuit means providing energizing connections between said protector means and both of said hot conductors; said circuit means normally connecting said protector means for energization from said first hot conductor, and additional means to automatically switch energization of said protector means to said second hot wire in the event said first hot wire becomes deenergized.

2. Ground fault detector-interrupter means as set forth in claim 1 in which the protector means includes an auxiliary transformer having an auxiliary secondary in series with the neutral conductor and an auxiliary primary connected from said neutral conductor through said circuit means to said hot conductors.

3. Ground fault detector-interrupter means as set forth in claim 1 in which the circuit means also includes primary and alternate current paths between said protector means and said first and second conductors, respectively; a shunt path connected to said alternate path and said neutral conductor; said shunt path including solid state switching means having a control electrode connected in said primary current path whereby said switching means is conducting when said first conductor is energized and is blocking when said first conductor is deenergized; with said switching means conducting said shunt path being closed whereby current in said alternate path bypasses said protector means and said protector means is energized through said primary path, and with said switching means blocking said protector means is energized through said alternate path.

4. Ground fault detector-interrupter means as set forth in claim 2 in which the circuit means also includes primary and alternate current paths between said auxiliary primary and said first and second conductors, respectively; a shunt path connected to said alternate path and said neutral conductor; said shunt path including solid state switching means having a control electrode connected in said primary current path whereby said switching means is conducting when said first conductor is energized and is blocking when said first conductor is deenergized; with said switching means conducting said shunt path being closed whereby current in said alternate path bypasses said auxiliary primary and said protector means is energized through said primary path, and with said switching means blocking said protector means is energized through said alternate path.

* * * * *